Feb. 28, 1933.   O. R. DECKERT   1,899,433
IMPLEMENT FOR CLEANING DISK KNIVES
Filed Jan. 11, 1932

Inventor.
Oscar R. Deckert
by Heard Smith & Tennant.
Attys.

Patented Feb. 28, 1933

1,899,433

UNITED STATES PATENT OFFICE

OSCAR R. DECKERT, OF BROOKLINE, MASSACHUSETTS, ASSIGNOR TO CUBE STEAK MACHINE COMPANY, OF BOSTON, MASSACHUSETTS, A CORPORATION OF MASSACHUSETTS

IMPLEMENT FOR CLEANING DISK KNIVES

Application filed January 11, 1932. Serial No. 585,930.

This invention relates to a device for cleaning disk knives. Knives of this type are used for cutting or slitting various materials and some of such materials are of such a nature that they tend to stick and to gum up the knives.

As illustrating one use to which disk knives of this type are put I would refer to the operation of slitting meat in steak form so as to provide an increased cooking surface. Where knives are used for this purpose the side faces of the knives are apt to become fouled with meat juices which adhere to them and become dry.

My improved implement is designed for scraping the side faces of disk knives to clean them. The implement may also be so constructed that it will function to sharpen the knives as well as to clean them.

A device embodying my invention comprises a plurality of blade elements connected together so that they can be separated sufficiently to permit a disk knife to be inserted between them, said blade elements being held in parallel relation and being acted on by spring means which tends normally to force them toward each other and thereby into contact with opposite faces of the disk knife.

In order to give an understanding of the invention I have illustrated in the drawing a selected embodiment thereof which will now be described after which the novel features will be pointed out in the appended claims.

Figure 1:
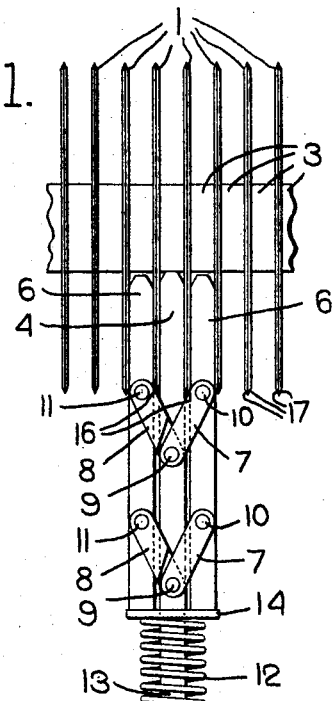
Fig. 1 is a view showing a knife-cleaning implement embodying my invention and illustrating how it is used.
Figure 2:
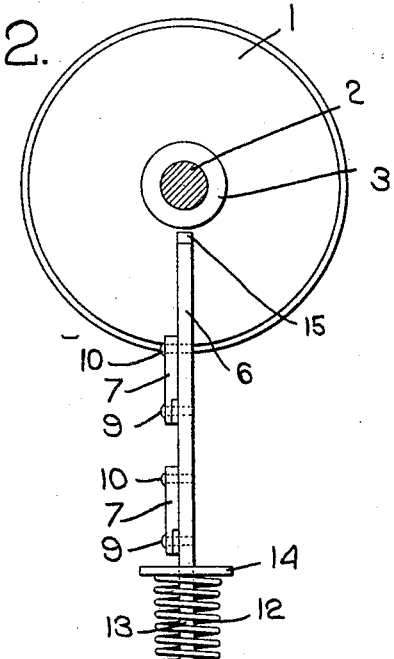
Fig. 2 is a side view of Fig. 1.
Figure 3:
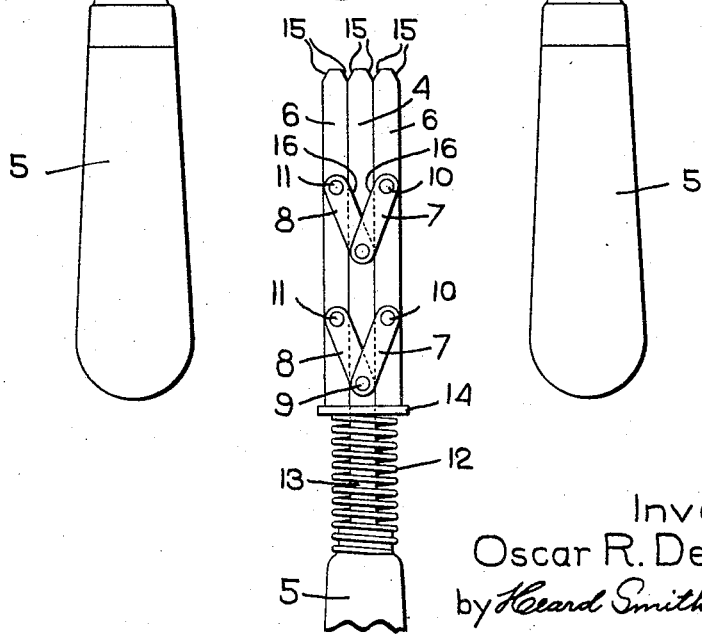
Fig. 3 is a fragmentary view of the implement.

While the implement may be used for cleaning a single disk knife yet the embodiment herein shown is constructed so that it may be used for cleaning disk knives when arranged in a gang.

In the drawing 1 indicates the disk knives of a gang of knives, said knives being mounted on a suitable shaft 2 and being separated by collars 3 carried by the shaft.

My improved implement comprises a plurality of blades each having a transverse dimension such as to permit it to be inserted between two adjacent knives 1 together with means acting on said blades tending to force them toward each other to permit them to yield sufficiently to allow the knives to be inserted between the blades when the latter are placed in operative position between the knives.

In the particular construction shown the implement comprises a main blade 4 which is shown as rigidly secured to a suitable handle 5 by which the implement may be manipulated. Associated with this blade 4 are one or more other similar blades 6. Where the device is to be used for cleaning the knives of a gang of knives these blades will preferably have a transverse dimension substantially equal to the space between adjacent knives so that the blades can be readily inserted between the knives as shown in Fig. 1.

The blades are held in parallel relation and spring means is employed which tends to urge the blades yieldingly toward each other, said means permitting the blades to be inserted between them. In the construction herein shown the implement has three blades, the central blade 4 which is secured to the handle 5 and two blades 6, one either side of the central blade. The blades 6 are connected to the blade 4 with a parallel ruler motion connection so that while the blades can move toward and from each other they will always be maintained in parallel relation during such movement.

As herein shown the connection between each blade 6 and the central blade 4 comprises a pair of parallel links pivotally connected both to the central blade 4 and the movable blade 6. The links of one pair are indicated at 7 and those of the other pair at 8. The parallel links 7 are connected to the central blade 4 at 9 and to the blades 6 at 10. The parallel links 8 are also connected to the central blade 4 coaxially with the links 7 and are connected to the left hand blade 6 at 11. This construction permits each blade 6 to move toward and from the central blade 4 but always maintains the parallel relation of the blades.

As stated above suitable spring means is provided for urging the blades 6 toward the blade 4 and while any appropriate means for this purpose may be provided I have herein shown a simple device comprising a spring 12 which surrounds the shank portion 13 of the blade 4 and is confined between the handle 5 and a collar 14 through which the blade 4 extends and which abuts against the inner end of the blades 6. This spring tends to force the collar 14 toward the ends of the blade 4 and thereby applies a pressure against the blades 6 in the direction of their length and toward their free ends, such pressure, of course, yieldingly urging the blades 6 toward the central blade 4.

The ends of each blade are preferably tapered slightly as shown at 15 to facilitate the insertion of the blades between the knives 1.

In using the device all that is necessary is to place the implement against the edges of the knives 1 with said knives occupying the V-shaped notches at the ends of the blades formed by the bevelled portion 15 thereof and then to apply a pressure against the implement tending to force the blades between the knives. The action of the periphery of the knives against the tapered faces 15 will serve to separate the blades sufficiently to allow the knives to enter between the blades as shown in Fig. 1. The separation of the blades 6 from the blades 4 causes the blades 6 to move backwardly slightly because of the parallel ruler connection 7 and this backward movement is resisted by the spring 12. Said spring thus tends to urge the blades 6 forwardly and also to hold them yieldingly against the side faces of the knives which are confined between the blades 6 and 4. These blades are preferably rectangular in cross section and thus act as scraping blades so that if the blades are inserted between the knives and the latter are rotated the blades will scrape the side faces of the knives and thus clean them from any deposit which may have accumulated thereon.

The device may also be constructed so that it will act to sharpen the knives as well as to clean them. This may be accomplished by making the faces 16 of the links 7 and 8 which are nearest the free ends of the blades with a surface of a character which will have a sharpening or abrasive action on the cutting edges 17 of the knives. If this construction is employed then when the implement is inserted between the knives to clean the latter the frictional engagement of the cutting edges of the knives with the surfaces 16 will serve to sharpen the knives.

I claim.

1. A device for cleaning a gang of disk knives comprising a plurality of parallel blades each of a size to fit between two adjacent knives, and spring means tending to hold the blades yieldingly in contact with each other while permitting the blades to be separated from each other sufficiently to receive the knives between them when they are inserted between the knives.

2. A device for cleaning disk knives comprising a pair of parallel knife-cleaning blades, a connection between said blades permitting them to separate from each other but maintaining the adjacent faces thereof in parallel relation during any movement of the blade towards and from each other, and spring means for normally urging the blades toward each other.

3. A device for cleaning the knives of a gang of knives comprising a central blade, other blades connected to the central blade to permit them to move toward and from the central blade but maintaining them in parallel relation to said central blade, each blade being of a size to fit between two adjacent knives, and spring means acting on the movable blades urging them toward the central blade.

4. In a device for cleaning and sharpening knives of a gang of disk knives, said device comprising a central blade, two other blades, one on each side of the central blade, said blades being movable towards and from each other, a connection between the central blade and each of the other blades which maintains them in parallel relation during any movement towards and from each other, spring means acting on each of said other blades tending to fold them against the central blade, said connection being provided with means for engaging and sharpening the cutting edges of the knives when the blades are inserted between the knives for cleaning them.

5. A device for cleaning disk knives comprising a pair of parallel blades, a connection between said blades permitting them to separate from each other but maintaining them in parallel relation during such separating movement, spring means for normally urging the blades toward each other, said connection being provided with means for engaging and sharpening the cutting edge of the knife when the latter is inserted between the blades.

In testimony whereof, I have signed my name to this specification.

OSCAR R. DECKERT.